(12) United States Patent
Alloin et al.

(10) Patent No.: US 11,248,578 B2
(45) Date of Patent: Feb. 15, 2022

(54) METHOD FOR OPERATING A HYDRAULIC MACHINE AND CORRESPONDING INSTALLATION FOR CONVERTING HYDRAULIC ENERGY INTO ELECTRICAL ENERGY

(71) Applicant: GE Renewable Technologies, Grenoble (FR)

(72) Inventors: Quentin Alloin, Grenoble (FR); Theophane Foggia, Lyons (FR); Renaud Guillaume, St Martin d' Hères (FR)

( * ) Notice: Subject to any disclaimer, the term of this patent is extended or adjusted under 35 U.S.C. 154(b) by 188 days.

(21) Appl. No.: 16/494,536

(22) PCT Filed: Mar. 15, 2018

(86) PCT No.: PCT/EP2018/056600
§ 371 (c)(1),
(2) Date: Sep. 16, 2019

(87) PCT Pub. No.: WO2018/167240
PCT Pub. Date: Sep. 20, 2018

(65) Prior Publication Data
US 2020/0088152 A1  Mar. 19, 2020

(30) Foreign Application Priority Data
Mar. 17, 2017 (EP) ..................................... 17290040

(51) Int. Cl.
*F03B 15/10* (2006.01)
*F03B 3/10* (2006.01)

(52) U.S. Cl.
CPC .............. *F03B 3/103* (2013.01); *F03B 15/10* (2013.01)

(58) Field of Classification Search
CPC .......... F03B 15/005; F03B 15/00; F03B 3/02; F03B 3/10; F03B 3/103
See application file for complete search history.

(56) References Cited

U.S. PATENT DOCUMENTS 6,784,565 B2 * 8/2004 Wall ......................... H02J 1/10
290/52
9,429,136 B2 * 8/2016 Kusunoki ............... F03B 13/10
(Continued)

FOREIGN PATENT DOCUMENTS

| DE | 1426597 A1 | 11/1969 | |
| EP | 2818692 A1 | 12/2014 | |
| FR | 2324895 A1 * | 4/1977 | ............ F03B 15/005 |

(Continued)

OTHER PUBLICATIONS

FR-2324895-A1 Machine Translation. Accessed EPO website May 19, 2021. (Year: 2021).*

(Continued)

*Primary Examiner* — Richard A Edgar
(74) *Attorney, Agent, or Firm* — Dority & Manning, P.A.

(57) ABSTRACT

This installation for converting a hydraulic energy into electrical energy comprises a hydraulic adapted to be operated either in a pump mode or in a turbine mode.
It further comprises means (25) for applying an electric torque to the rotor to control the rotation speed of the machine during transitions between the pump mode and the turbine mode.

17 Claims, 6 Drawing Sheets

(56) References Cited

U.S. PATENT DOCUMENTS

2004/0115048 A1    6/2004  Kuwabara
2005/0225302 A1*  10/2005  Herzog .................... H02P 9/42
                                                           322/29

FOREIGN PATENT DOCUMENTS

| WO | WO0039458 A1 | | 7/2000 | |
| --- | --- | --- | --- | --- |
| WO | WO2005/073550 | | 8/2005 | |
| WO | WO-2005073550 A1 | * | 8/2005 | ............ F03B 15/005 |
| WO | WO2012/129581 A2 | | 10/2012 | |

OTHER PUBLICATIONS

WO-2005-073550-A1 Machine Translation. Accessed EPO website May 19, 2021. (Year: 2021).*
PCT International Search Report Corresponding to PCT/EP2018/056600 dated May 24, 2018.

* cited by examiner

METHOD FOR OPERATING A HYDRAULIC MACHINE AND CORRESPONDING INSTALLATION FOR CONVERTING HYDRAULIC ENERGY INTO ELECTRICAL ENERGY

The invention relates to a method for operating a hydraulic machine. In particular, the invention relates to a method for operating a hydraulic machine in order to control transitions between operation modes of the machine.

The invention also concerns an installation for converting hydraulic energy into electrical energy, in which said method can be implemented.

In one embodiment, the invention relates to a method for controlling operation of hydro-power plants having a pump-turbine.

Hydro-power plants having a pump turbine may be operated in (i) a turbine mode in which hydraulic energy is used to rotate a shaft coupled to a generator to convert the mechanical energy of the rotating shaft into electrical energy; or (ii) a pump mode in which electrical energy powers the pump turbine which pumps water into an elevated storage volume, such as a reservoir. The stored water may be used at a later time to power the pump turbine in turbine mode.

Hydraulic machines in turbine mode may have several operation states and corresponding operation mode transitions, namely a standstill or a speed no-load operation mode.

During start-up in turbine mode, the hydraulic machine is accelerated using hydraulic torque applied to a runner. The runner comprises blades which are pushed by the flow of the water. The runner is coupled to a shaft which rotates a generator.

The hydraulic torque is first applied as from opening of a main inlet valve mounted within a hydraulic pipe upstream of the machine. The machine starts to rotate when controllable parts, such as guide valves, injectors or a controllable pitch, are actuated.

The start-up sequence of a hydraulic machine in a turbine mode thus comprises several steps. Namely, a first step in which the main inlet valve starts to open; a speed ramp-up in which the machine is accelerated; a step of coupling the machine to the grid; and a load inlet step. The coupling is typically achieved by closing a main circuit breaker.

A need exists to reduce the duration of the start-up sequence of the hydraulic machine in turbine mode. Reference can be made to International Patent Application Publication Number WO 2005/073550 which discloses a method and a device for starting a pump turbine using a startup converter and a hydraulic torque to accelerate the machine up to a target speed.

However, a need still exists to reduce the transient time during transitions between the pump mode and the turbine mode.

European Patent Application Publication Number EP 2 818 692 A1 discloses a system in which the rotational speed of a pump-turbine is compared with an optimal rotational speed. The system is arranged to operate in pump mode or turbine mode, but does not describe how to transition between those modes.

The invention thus proposes a method of operating a hydraulic machine for controlling a transition between a pump mode of the machine and a turbine mode of the machine. Preferably, the method comprises providing a hydraulic torque and/or preferably an electric torque to the hydraulic machine to control the rotation speed of the machine during the transition. The hydraulic machine may comprise a fixed speed or a variable doubly-fed electric machine.

The electric torque is used to accelerate or decelerate the machine, which permits to reduce the transient time between the pump and turbine modes.

According to a preferred feature of the invention, the method may further comprise a step of providing an electric torque to the machine so as to reach a target rotational speed.

Accordingly, the invention advantageously provides a positive or a negative electric torque, namely a motor torque or a braking torque, to the machine so as to increase or reduce the rotation speed of the machine to reach the target rotational speed.

According to another preferred feature of the method, the electric torque may be provided by a control loop feedback system having a control loop comprising an electric power source and preferably a controller. The controller is preferably arranged to control the electric power source so as to reduce a speed difference between a measured rotation speed of the machine and a target rotation speed.

The method may comprise calculating a speed difference between the rotational speed of the hydraulic machine and the target rotational speed. The method may comprise orienting a distributor according to an orientation. The method may comprise applying an electric torque to the machine corresponding to the speed difference.

In a preferred embodiment of the invention, electric power and/or the electric torque may be provided by a variable-frequency drive the variable-frequency drive may be connected to an electrical grid and preferably to an alternator of the hydraulic machine. The variable-frequency drive may be a static frequency converter. The static frequency converter may be a voltage source inverter or a current source inverter.

In one embodiment, electric power may be provided using a battery connected to the alternator of the hydraulic machine. Preferably, the electric power is provided by a power conversion unit which may convert direct current to alternating current (DC/AC).

In a further embodiment, the electric torque may be provided using both a variable frequency drive connected to the grid and to an alternator of the hydraulic machine, and a battery connected to the alternator.

The method may comprise coupling the hydraulic machine to a grid. The step of coupling the hydraulic machine to the grid may comprise opening an electric torque circuit breaker between the source of the electric torque and the machine. The step of coupling the hydraulic machine to the grid may comprise closing a grid circuit breaker between the machine and the grid.

The speed difference may be processed to calculate the orientation of the distributor. The method may comprise processing the speed difference and outputting an orientation control set-point. The orientation control set-point may be received by an actuator to orientate the distributor.

The speed difference may be processed by an electric torque controller. The electric torque may be provided by an electric power source to reduce the speed difference.

The electric torque may be provided by a battery. The electric power source may be connected to an electricity grid.

According to another aspect of the invention, there is provided an installation for converting a hydraulic energy into electrical energy. The installation preferably comprises a hydraulic machine adapted to be operated either in a pump mode or in a turbine mode. The machine preferably comprises a rotor operatively connected to a runner. The installation may further comprise apparatus for applying an electric torque to a rotor to control the rotation speed of the machine during transitions between the pump mode and the turbine mode.

According to a further feature of this installation, said apparatus for applying an electric torque to the rotor may comprise a control loop feedback system. The control loop feedback system may comprise a control loop having an electric power source and preferably a controller for controlling the electric torque applied to the hydraulic machine. The electric torque may be applied to the machine so that the rotor reaches a target rotation speed.

The hydraulic machine may comprise a distributor adapted to modify a water flow.

The installation may comprise a further control loop arranged to calculate an orientation of the distributor and orientate the distributor according to the calculated orientation.

The installation may further comprise a control apparatus arranged to output an orientation set point.

The control apparatus may be arranged to process a speed difference between the rotational speed of the hydraulic machine and the target rotation speed.

The further control loop may comprise an actuator arranged to orientate the distributer. The actuator may be arranged to orientate the distributer according to an orientation which may correspond to an optimum orientation of the distributer.

The control loop may comprise an electric power source arranged to provide the electric torque to the machine to reduce the speed difference. The installation may comprise an electric source circuit breaker between the electric power source and the machine.

The installation may comprise a grid circuit breaker between the machine and an electricity grid.

The electric power source may comprise a variable frequency drive which may be connected to an electricity grid and preferably to the alternator of the hydraulic machine. The electric power source may comprise a battery. The battery may be connected to an alternator of the hydraulic machine The control apparatus may be arranged to output an electric torque set-point. The control apparatus may comprise an electric torque set-point controller to output the electric torque set-point.

Other features and advantages will become apparent from the following description, given only by way of example, in view of the foregoing drawings, in which.

Figure 1:
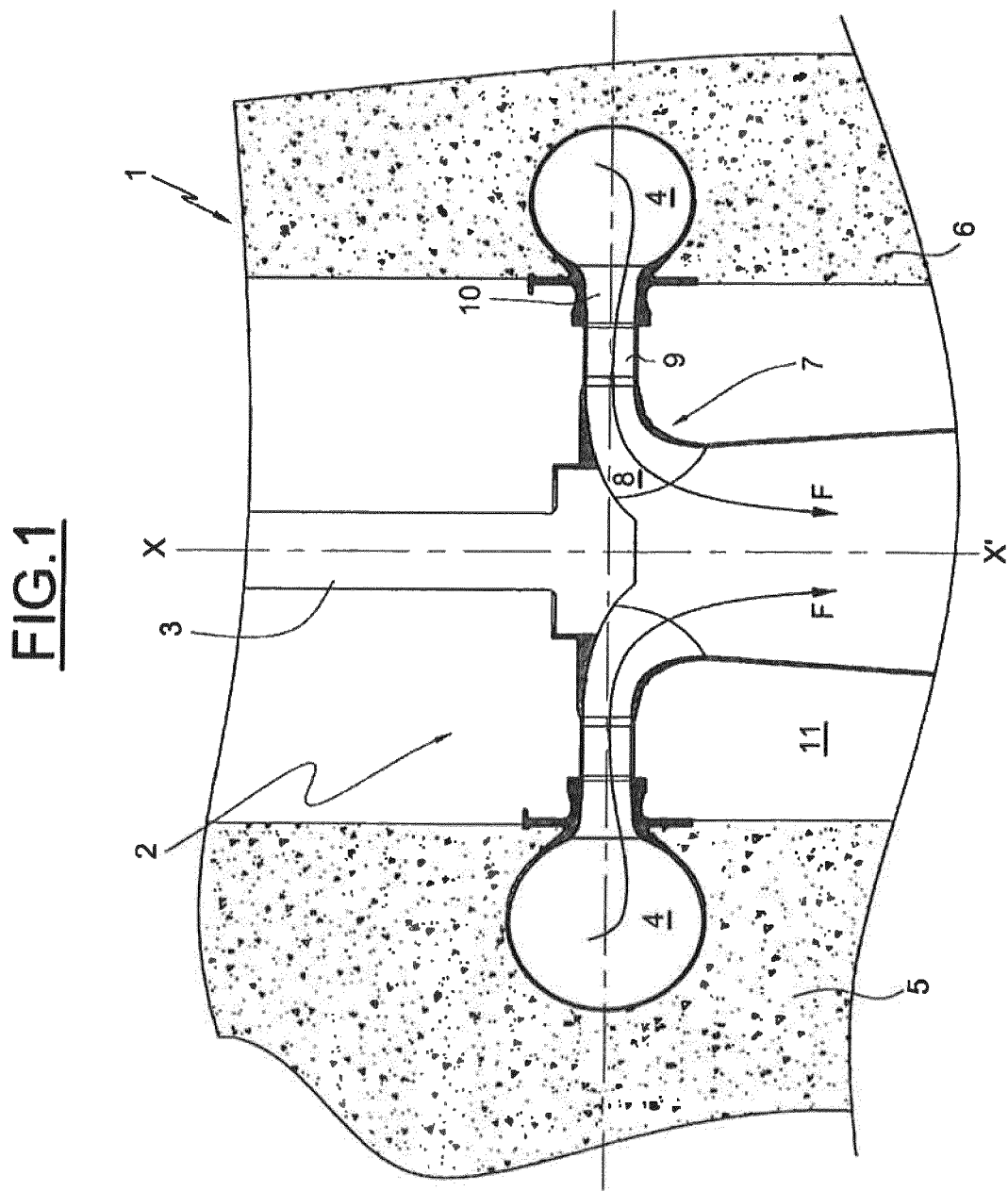
FIG. 1 is a schematic section of an installation for converting hydraulic energy into electrical energy comprising a pump-turbine.
Figure 5:
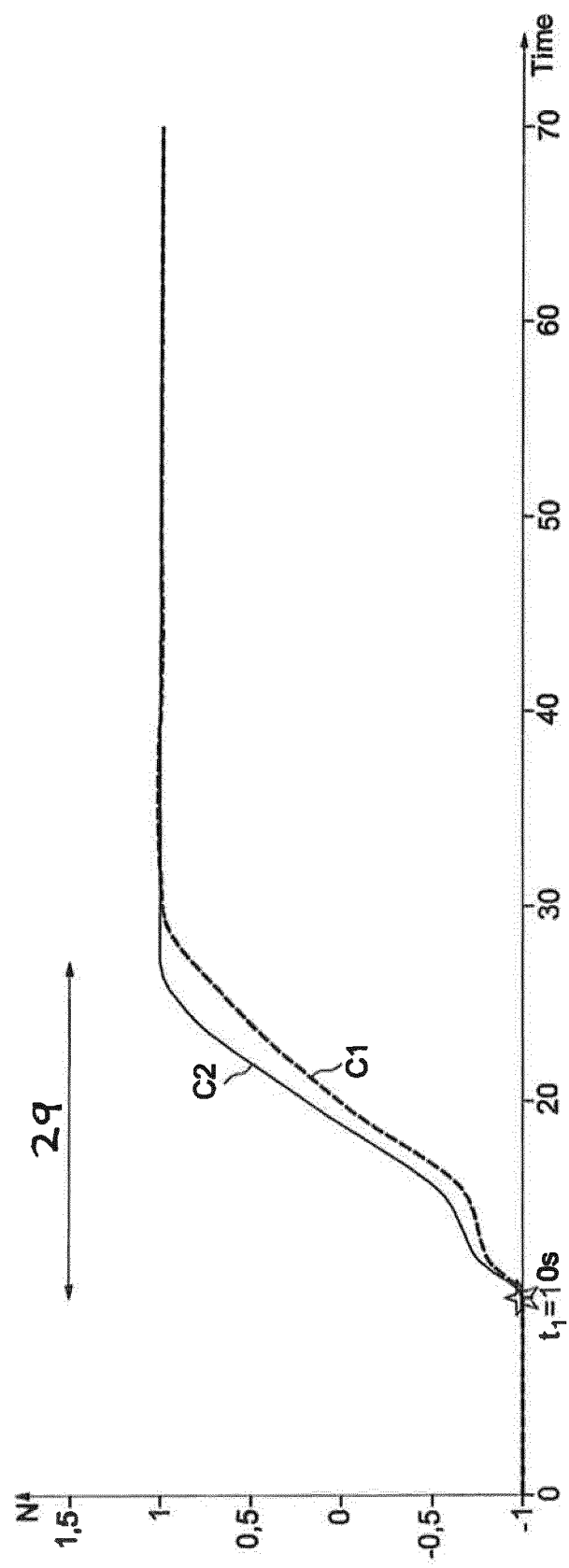
Figure 6:
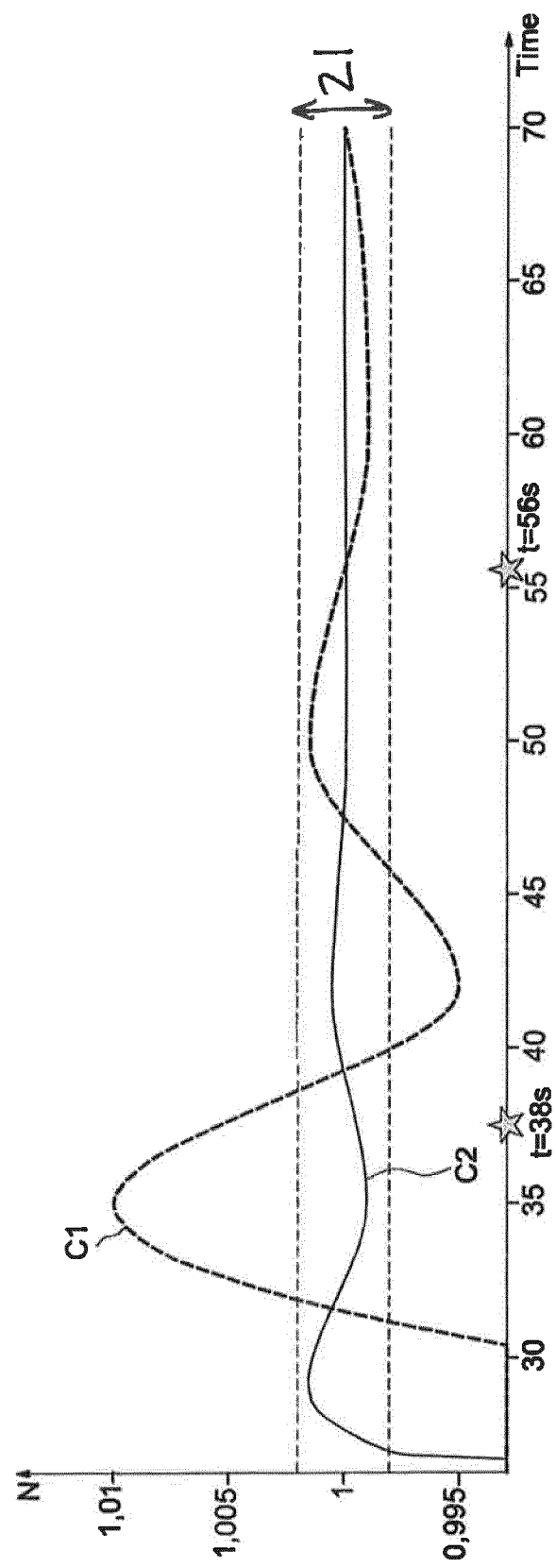

FIG. 5 is a graph representing the rotation speed of the machine, plotted over time, in a turbine mode of a pump-turbine of the installation of FIG. 1, wherein the graph illustrates the transition sequence between pump and turbine operating modes; and FIG. 6 shows a graph, at a larger scale, showing the rotation speed of the machine, plotted over time, during the synchronization phase of the machine.

Reference is first made to FIG. 1 which represents an installation 1 for converting hydraulic energy into electrical energy, wherein the installation 1 includes a hydraulic machine 2. In the illustrated example, this hydraulic machine is a pump-turbine 2 that uses, in a turbine mode, hydraulic energy to set a shaft 3 in rotation. The shaft 3 is coupled to the rotor of a generator (not shown) having an alternator that converts mechanical energy of the rotating rotor to produce electrical energy.

In a pump mode, the generator is powered by electrical energy provided by an electric grid, which in turn drives the pump-turbine 2 to pump water to a higher elevation. Thereby converting electrical energy into potential energy.

In one aspect of the invention, the generator of the hydraulic machine is a fix-speed machine. Alternatively, the hydraulic machine may be a doubly-fed electric machine, namely a variable speed machine in which the generator comprises multiphase windings set on the rotor and stator and a voltage source converter to control rotor currents.

Here-below, the functioning of the pump-turbine 2 is described in the turbine mode. The pump-turbine 2 includes a volute 4 that is supported by concrete blocks 5 and 6. For example, a non-represented penstock extends between a non-represented upstream reservoir and the volute 4. This penstock generates a forced water flow F to power the machine 2.

The machine 2 includes a runner 7 coupled to the shaft 3 that is surrounded by the volute 4 and that includes blades 8 between which water flows in operating conditions. As a result, the runner 7 rotates around an axis x-x' of the shaft.

A distributor is arranged around the runner 7. It includes a plurality of movable guide vanes 9 that are evenly distributed around the runner 7. A pre-distributor is disposed upstream of and around the distributor. In the illustrated embodiment in which the hydraulic machine is a pump-turbine, the pre-distributor is formed by a plurality of fixed guide vanes 10 evenly distributed around the axis of rotation x-x' of the runner 7.

A suction pipe 11 is disposed below the runner 7 and is adapted to evacuate water downstream.

The guide vanes 9 of the distributor each have an adjustable pitch around an axis parallel to the axis of rotation x-x' of the runner 7. Consequently, the guide vanes 9 may be swiveled to regulate the water flow rate. The guide vanes 9 are all oriented with the same angle relative to a closed position and are opened during start-up.

As previously indicated, a need exists to reduce the transient time of the transitions between the pump mode and the turbine mode.

Figure 2:
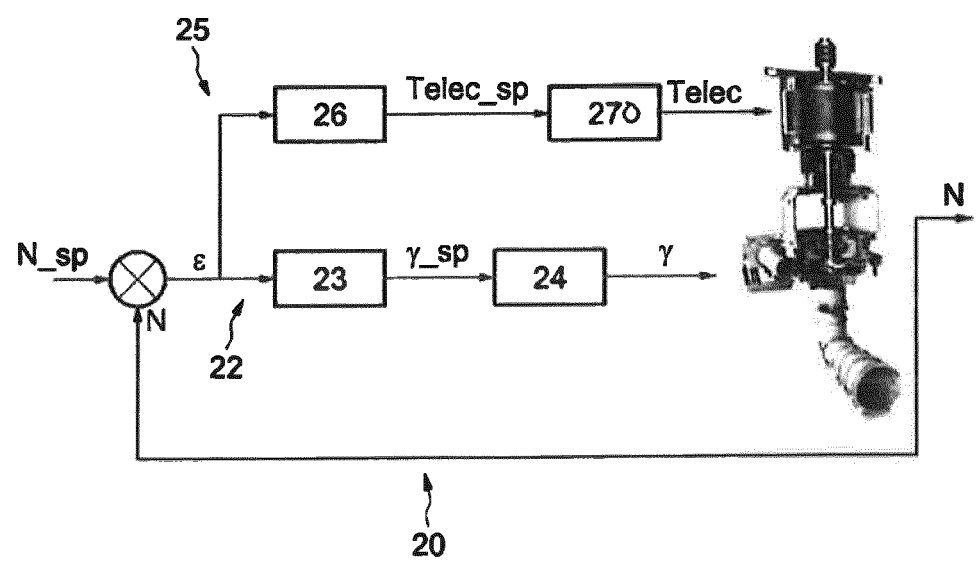
FIG. 2 is a control scheme illustrating a method according to the invention for reducing the start-up time of the installation.

Reference is now made to FIG. 2 which illustrates a control scheme of a hydraulic installation permitting to control the transitions between the pump mode and the turbine mode.

As illustrated, the method according to the invention is implemented by means of a control loop feedback system 20. The control loop feedback system 20 comprises a first control loop 22 to regulate the rotation speed of the machine around a target rotation speed N_sp using a hydraulic torque and a second control loop 25 to regulate the rotation speed of the machine around the target rotation speed N_sp using an electric torque.

For example, the rotation speed of the turbine can be determined by measuring the frequency of the electrical generator coupled to the shaft 3.

The first control loop 22 comprises a first guide vane controller 23 that takes as input a speed difference ε between a rotational speed N of the hydraulic machine and the target rotation speed N_sp and a guide vane actuator 24. The first controller 23 outputs an orientation control signal γ_sp to the guide vane actuator 24 to affect accordingly the guide vanes orientation γ.

The first controller 23 processes the speed difference ε and outputs an orientation control set-point γ_sp to the guide vane actuator 24. The orientation control set-point γ_sp corresponds to the optimum guide vane orientation γ to stabilize the hydraulic machine. The guide vane actuator 24 orientates the guide vanes according to the optimum orientation γ.

The guide vane controller 23 may, for example, be a Proportional Integrative Derivative controller (PID).

The second control loop 25 comprises an electric torque controller 26 that takes as an input the speed difference ε between the rotation speed N of the hydraulic machine and the target rotation speed N_sp to output an electric torque set point Telec_sp.

The control loop feedback system 20 also comprises an electric power source 270 that accordingly affects the electric torque Telec provided to the rotor.

In a further embodiment of the invention, a single main controller is configured to perform the functions of one or both of the guide vane controller 23 and the electric torque controller 26.

The electric torque set-point is calculated by the controller 26 to accelerate or decelerate the machine rotation speed to reduce or eliminate the speed difference ε.

In one embodiment, the second controller 26 is a variable frequency drive controller, such as a static frequency converter controller (SFC).

The electric power source 270 may be a variable frequency drive (VFD) 27, for example a static frequency converter. The static frequency converter may be a voltage source inverter or a current source inverter. The variable-frequency drive is connected to an electricity distribution grid and controlled by the variable-frequency drive controller 26 to provide a positive or a negative electric torque to the generator.

For example, the static frequency converter may comprise a rectifier stage connected to the grid to produce a direct current and an inverter stage for voltage and frequency conversion.

Figure 3:
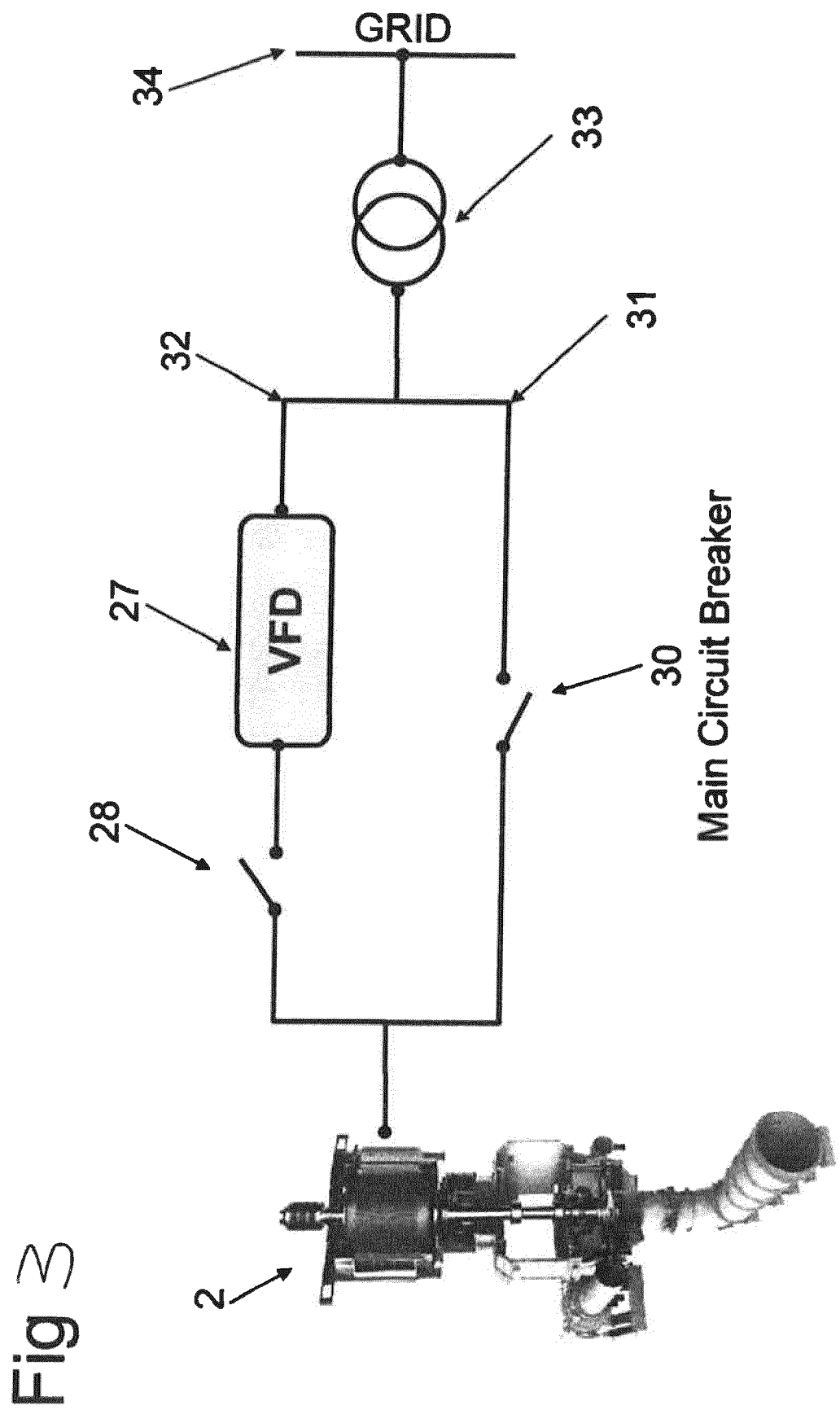
FIG. 3 is a schematic drawing illustrating the variable-frequency drive unit and the power connections existing between it, the grid and the pump-turbine.

FIG. 3 illustrates an embodiment of the invention in which the variable frequency drive 27 provides an electrical torque to the pump-turbine machine 2. A circuit breaker 28 links the variable-frequency drive 27 with the machine 2. When the circuit breaker 28 is in a closed position the variable frequency drive 27 provides the electrical torque to the machine 2. At the same time a main circuit breaker 30 located between the machine 2 and the grid 34 is in an open position. The variable frequency drive 27 is powered by the grid 34 via an AC transformer 33 and a VFD cable 32.

Once the rotational speed of the machine 2 is stabilized, the frequencies on each side of the main circuit breaker 30 are equalized. Once equalization has been achieved, connection of the machine 2 to the grid 34 is performed by closing the main circuit breaker 30 and opening circuit breaker 28. Power is then provided directly to the grid 34 through the line 31 in generation operation.

The variable frequency drive 27 may comprise switching cells using diodes and transistors working as switches and controlled by the SFC controller 26 to produce the desired electric torque.

The electric torque provided by the second loop 25 is used to cooperate with the hydraulic torque from the first loop to reduce the transient time between the pump mode and the turbine mode.

Figure 4:
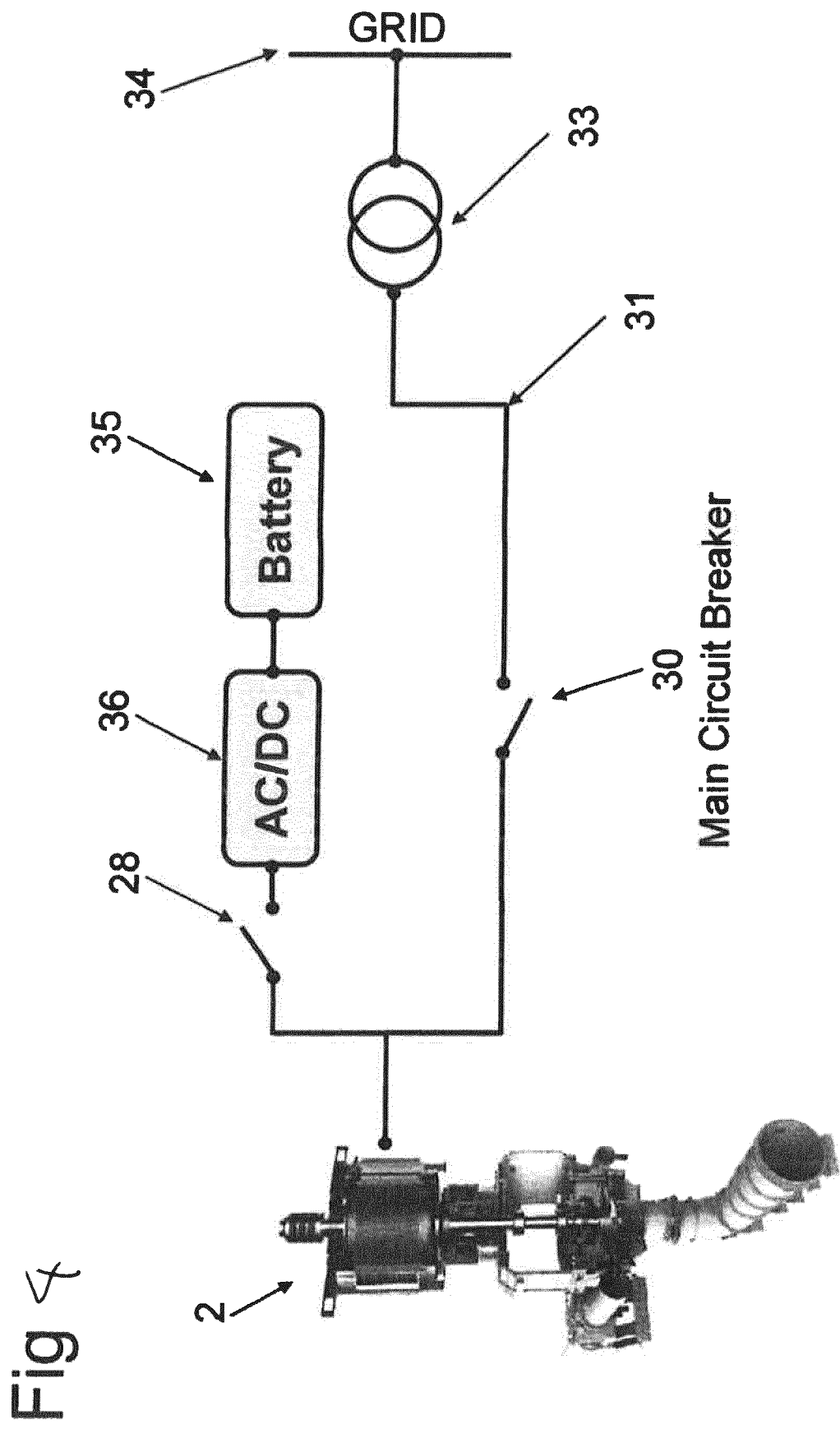
FIG. 4 is a schematic drawing illustrating another embodiment of the invention which includes a battery, a DC/AC power conversion unit and the connections existing between them, the grid and the pump-turbine.

FIG. 4 illustrates an alternative way to provide an electrical torque to the machine 2. Features found in FIG. 4 retain the reference numerals found in FIG. 3.

In this alternative embodiment a battery 35 is used instead of the variable frequency drive 27. A DC/AC conversion unit 36 provides the electrical power of the battery 35 to the machine 2 via the circuit breaker 28. When the battery 35 provides the electrical power to the machine 2, the circuit breaker 28 is in closed position and a main circuit breaker 30 is in an open position.

Once the speed of the pump-turbine 2 is stabilized, the frequencies on each side of the main circuit breaker 30 are equal. This enables connection of the machine 2 to the grid 34 which is achieved by closing main circuit breaker 30 and opening circuit breaker 28. The power is then provided directly to the grid 34 through the line 31 and AC transformer 33 in generation operation.

According to another embodiment of the invention, the second control loop 25 comprises a variable-frequency drive governed by a VFD controller and a battery governed by a battery controller. The battery is connected in parallel to the variable frequency drive to provide the generator of the machine with an electric torque to adjust the rotation speed of the machine. Preferably, the battery may be charged by the grid.

The battery may comprise an internal control stage connected to the controller 26 in order to provide the generator of the machine with a positive or a negative electric torque to adjust the rotation speed of the machine to the target speed value.

Reference is now made to FIGS. 5 and 6 which illustrate the advantages of the invention during a transition from a pump mode to a turbine mode.

In FIGS. 5 and 6, curve C1 corresponds to a pump mode to a turbine mode transition using the first control loop 22 such that the machine is accelerated using the hydraulic torque; and curve C2 corresponds to a pump mode to turbine mode transition in which the machine is accelerated using the hydraulic torque and the electric torque from the first and second control loops.

FIGS. 5 and 6 illustrate the variation of the rotation speed of the machine plotted over time. FIG. 6 represents the variation of the rotation speed of the machine at a larger scale, compared to FIG. 5.

The transition begins when a start order is received at instant $t_1$ to transition from pump mode to turbine mode. The transition period 29 is the length of time it takes to transition from pump mode to turbine mode. The start order causes the main circuit breaker 30 to be opened so that electrical power is no longer being supplied to the generator to pump water to a higher elevation.

When the electrical power is no longer supplied to the generator, gravity acts to slow and reverse the flow of water through the machine. The result of this action is illustrated by curve C1.

As illustrated, the hydraulic machine is accelerated until the rotation speed lies within a coupling range 21 (FIG. 6). In addition, when the rotation speed lies within the coupling range 21, a stabilization phase is carried out for eliminating oscillations in the rotation speed around the coupling zone.

As shown in FIG. 6, when the main circuit breaker 30 is opened and the machine is decelerated from pump mode and accelerated to turbine mode by a hydraulic torque only, the rotation speed reaches the coupling zone 21 at around 22 seconds after the start order has been received.

Curve C2 shows the rotation speed over time when the machine is acted on by a hydraulic torque and electric torque according to the invention. As can be seen, the rotation speed may reach the coupling zone about 18 seconds after the start order has been received.

Decelerating and reversing the machine using the first and second control loops, namely by the electric torque and the hydraulic torque applied to the machine, reduces the time required to couple the pump turbine to the grid.

The machine may only be coupled to the grid in turbine mode when the curve C1, C2 remains within the coupling zone.

In this specific example, using variable frequency drive assisted acceleration, the machine can be coupled to the grid 28 seconds after the start order has been received. This is in contrast to the prior art hydraulic torque only method in which the machine may only be connected to the grid 46 seconds after the start order has been received.

The aforementioned embodiments are not intended to be limiting with respect to the scope of the appended claims. Furthermore, features of one or more of the above embodiments may be readily combined with one or more features of another embodiment. It is also contemplated by the inventors that various substitutions, alterations, and modifications may be made to the invention without departing from the scope of the invention as defined by the claims.

The invention claimed is:

1. A method of operating a hydraulic machine for controlling a transition between a pump mode wherein the hydraulic machine is rotated in a first direction and a turbine mode wherein the hydraulic machine is rotated in an opposite direction, the method comprising applying a hydraulic torque and an electric torque to the hydraulic machine during the transition to apply a braking force for reversing direction of the hydraulic machine from the first direction to the opposite direction and control a rotation speed of the hydraulic machine during the transition to bring the rotation speed in the opposite direction to a speed for connecting the hydraulic machine to an electrical grid.

2. The method according to claim 1, in which the electric torque is applied using a control loop feedback system having a control loop comprising an electric power source and a controller for controlling the electric torque applied to the hydraulic machine.

3. The method according to claim 1, in which the electric torque is provided using a variable frequency drive connected to an electrical grid and to an alternator of the hydraulic machine.

4. The method according to claim 1, in which the electric torque is provided using a battery connected to an alternator of the hydraulic machine via a DC/AC conversion unit.

5. The method according to claim 1, in which the electric torque is provided using a variable frequency drive connected to an electrical grid and to an alternator of the hydraulic machine, and a battery connected to the alternator in parallel to the variable frequency drive.

6. The method according to claim 1, wherein the hydraulic machine comprises a fixed speed electric machine or a variable speed doubly-fed electric machine.

7. The method according to claim 1, comprising coupling the hydraulic machine to the electrical grid when a frequency of an output of the hydraulic machine in turbine mode is synchronized with a frequency on the grid.

8. The method according to claim 7, wherein the step of coupling the hydraulic machine to the electrical grid comprises closing a grid circuit breaker between the hydraulic machine and the electrical grid.

9. An installation for converting hydraulic energy into electrical energy, comprising: a hydraulic machine configured for operation either in a pump mode wherein the hydraulic machine is rotated in a first direction or in a turbine mode wherein the hydraulic machine is rotated in an opposite direction; and means for applying an electric torque and a hydraulic torque to a rotor of the hydraulic machine to apply a braking force for reversing direction of the hydraulic machine from the first direction to the opposite direction and control a rotation speed of the hydraulic machine during transitions between the pump mode and the turbine mode to bring the rotation speed in the opposite direction up to a speed for connecting the hydraulic machine to an electrical grid.

10. The installation according to claim 9, wherein the means for applying an electric torque to the rotor comprises a control loop feedback system comprising a control loop having an electric power source and a controller for controlling the electric torque applied to the hydraulic machine.

11. The installation according to claim 10, wherein the electric power source comprises a static frequency converter for connection to an electrical grid and to an alternator of the hydraulic machine.

12. The installation according to claim 10, wherein the electric power source comprises a battery for connection to an alternator of the hydraulic machine.

13. The installation according to claim 10, wherein the electric power source comprises a variable frequency drive for connection to an electrical grid and to an alternator of the hydraulic machine and a battery intended for connection to the alternator of the hydraulic machine in parallel to the variable frequency drive.

14. An installation for converting a hydraulic energy into electrical energy, comprising a hydraulic machine, configured for operation either in a pump mode wherein the hydraulic machine is rotated in a first direction or in a turbine mode wherein the hydraulic machine is rotated in an opposite direction, means for applying an electric torque to the rotor to control the rotation speed of the machine during transitions from the pump mode to the turbine mode, the means for applying an electric torque to the rotor comprising a control loop feedback system comprising a control loop having an electric power source and a controller for controlling the electric torque applied to the hydraulic machine.

15. The installation according to claim 14, wherein the electric power source comprises a static frequency converter connectable to an electrical grid and to an alternator of the hydraulic machine.

16. The installation according to claim 14, wherein the electric power source comprises a battery connectable to an alternator of the hydraulic machine.

17. The installation according to claim 14, wherein the electric power source comprises a variable frequency drive connectable to an electrical grid and to the alternator of the hydraulic machine and a battery connectable to the alternator of the hydraulic machine.

* * * * *